No. 744,750. Patented November 24, 1903.

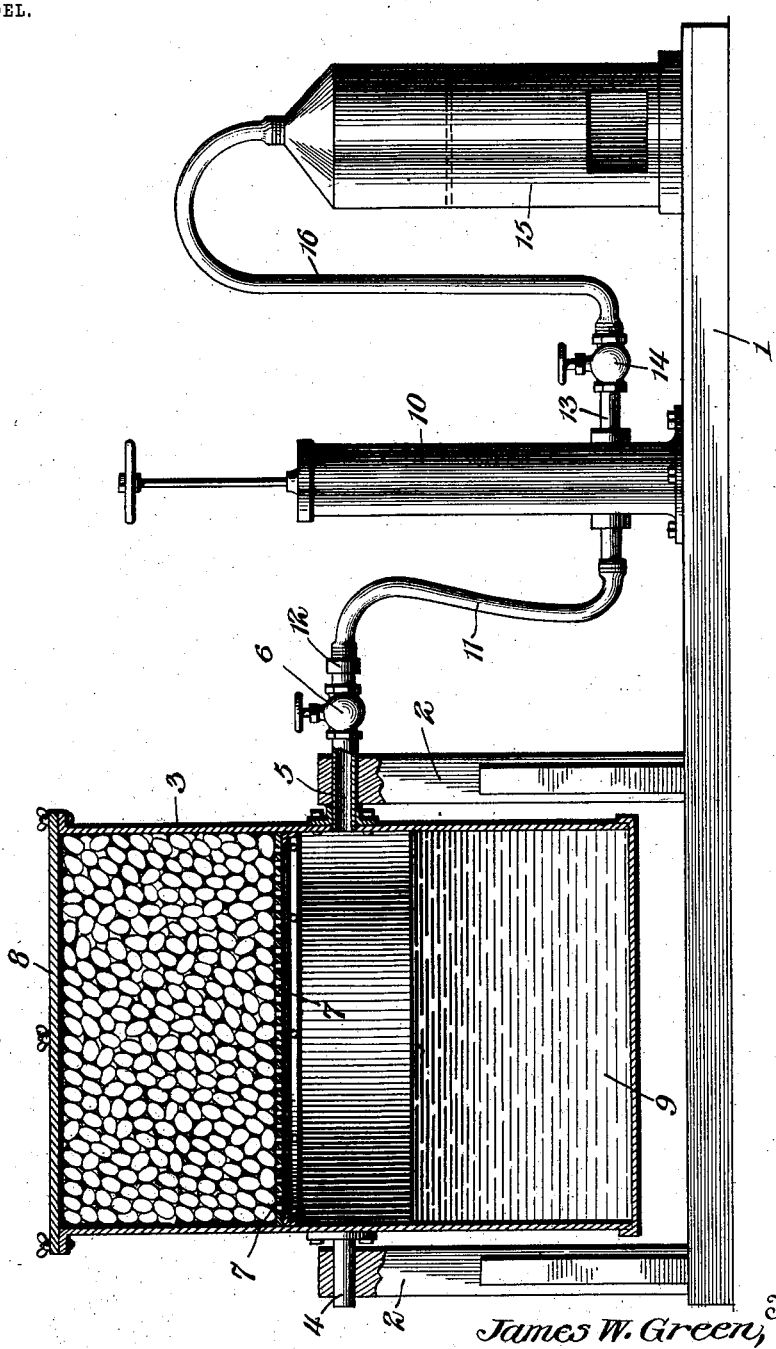

UNITED STATES PATENT OFFICE.

JAMES WILLIAM GREEN, OF PORTLAND, OREGON.

PROCESS OF PRESERVING EGGS.

SPECIFICATION forming part of Letters Patent No. 744,750, dated November 24, 1903.

Application filed April 17, 1902. Serial No. 103,331. (No specimens.)

*To all whom it may concern:*

Be it known that I, JAMES WILLIAM GREEN, a citizen of the United States, residing at Portland, in the county of Multnomah and State of Oregon, have invented a new and useful Process of Preserving Eggs, of which the following is a specification.

This invention relates to the art of preserving food products, and is particularly designed for preserving eggs in a simple, convenient, and economic manner without changing the color of the eggs, affecting their edible qualities, or impairing the eggs in any manner whatsoever.

In general the process consists in removing the air from the eggs, then subjecting the same to the action of an antiseptic, then applying a filling to the exterior of the eggs so as to close the pores of the shells, and, finally, applying a moisture-proof surface coating, so as to protect the filling, and thereby keep out the external air from the interior of the eggs.

In its specific aspect the present invention consists in placing the eggs in an air-tight vessel and extracting the air therefrom, so as to produce a partial vacuum, and thereby to permit of the escape of air, gases, germs, and other deleterious elements from the interior of the egg. After this step has been taken an antiseptic is applied to the eggs while the latter are still in the vacuum, so as to effectually exterminate such germs as may have emerged from the eggs and lie within the containing-receptacle and also by entering the interior of the egg through the porous shell thereof to prevent decomposition of the animal matter in the egg. The preferred antiseptic is sulfur fumes, although it will of course be understood that other antiseptics may be used.

The eggs are subjected to the action of the antiseptic for at least an hour, and then it is removed from the receptacle in any suitable manner so as to again produce a partial vacuum, after which a liquid filler is applied to the eggs while in the partial vacuum, so as to effectually close the pores of the shells, and thereby render the same air-tight for the purpose of excluding the external air from the interior of the eggs. This filler is preferably in the form of soluble glass, which is colorless, and therefore does not affect the appearance of the egg-shells.

Prior to the original removal of the air from the receptacle the filler of soluble glass is placed in the bottom of said receptacle, and the eggs are held above the same between two perforate or foraminous shelves or partitions, whereby the filler may be conveniently applied to the eggs by merely inverting the receptacle after the antiseptic has been removed therefrom.

After the filler has been applied the eggs are removed from the receptacle and permitted to dry in the open air, and a final moisture-proof surface coating is then applied to the eggs, so as to protect the filler from the action of dampness and changes in the atmosphere. A solution of white or bleached shellac and grain-alcohol has been determined by experiment to be the most effective surface coating.

From the foregoing statement of the present process it will be apparent that the agents to which the eggs are subjected do not have any injurious or deleterious effect upon the food properties of the egg, and neither do they change or alter the external appearance; but, on the other hand, they effectually remove and exterminate all germs and such undesirable matter as will decompose when exposed to the action of external air, and, furthermore, the germ-destroying agent is an antiseptic, and therefore effectually prevents decomposition of the animal matter of the egg, whereby the essential food products of the latter are unaffected and preserved for an indefinite period.

In order that an adequate understanding may be had of one manner of practicing the present process, I have shown in the accompanying drawing a side elevation, partly in section, of an apparatus which is one embodiment of means for carrying out the essential steps of the process.

Referring to the accompanying drawing, 1 designates a base or frame, from which rise a pair of standards 2. Between the standards 2 is a receptacle 3, which is provided at opposite sides with the journals 4 and 5, respectively, that are mounted in the standards 2, so as to support the receptacle above the base or platform 1 and also to permit of the receptacle being inverted. The journal 5 is tubular and communicates with the interior of the receptacle and is provided at its outer end with a valve 6. Within the receptacle and above the tubular journal is a perforate tray or partition 7, and the open top of the receptacle is provided with a removable cover 8, which is tightly secured in place in any suitable manner. In the bottom of the receptacle there is contained a suitable quantity of soluble glass 9, and the eggs to be treated are supported upon the tray or partition 7, it being understood that the eggs are snugly packed in the upper portion of the receptacle, so as to prevent appreciable movement and cracking thereof while the receptacle is being inverted.

A suitable air-pump 10, preferably a hand-operated pump, is supported upon the platform 1, adjacent to the tubular bearing 5, to which it is connected by means of a rubber or other flexible pipe 11, having a swiveled coupling 12 with the outer end of the journal. The lower portion of the pump is provided with an inlet-pipe 13, which has a suitable controlling-valve 14. A suitable sulfur-burning furnace 15 is supported upon the base or platform 1 and has its upper end connected with the outer end of the pipe 13 by means of a suitable pipe 16, whereby the sulfur fumes may be carried from the furnace to the pump.

In the operation of the apparatus the lid 8 and the perforate tray 7 are removed and the soluble glass introduced into the receptacle, after which the tray is replaced, the eggs are packed thereon, and the cover 8 is tightly secured in place. The valve 14 is then closed and the valve 6 opened, after which the pump is manipulated to draw the air out of the receptacle, after which the valve 14 is opened, so as to permit of the sulfur fumes passing through the pipes 16 and 11 and into the interior of the receptacle, so as to attack the eggs, it being understood that the valve 6 is then closed and the device permitted to stand for about an hour, after which the valve 14 is closed and the valve 6 opened and the pump manipulated to withdraw the sulfur fumes. The valve 6 is then closed and the receptacle inverted, so as to deposit the soluble glass upon the eggs. The receptacle is then returned to its normal position, the cover 8 taken off, and the eggs removed, and after they have become thoroughly dried the shellac is applied thereto, as hereinbefore described.

What I claim is—

1. The herein-described process for preserving eggs consisting in placing the eggs in an air-tight receptacle, creating a vacuum in the receptacle to permit the escape of germs and gases from the interior of the eggs, subjecting them to the action of a gaseous antiseptic to kill the germs emerging from the eggs and by entering the pores of the latter to prevent decomposition, removing the gaseous antiseptic from the receptacle and creating another vacuum therein, and closing the pores of the eggs with a soluble sealing material without affecting the vacuum formed by the removal of the gaseous antiseptic, substantially as described.

2. The herein-described process for preserving eggs consisting in placing the eggs in an air-tight receptacle, creating a vacuum in the receptacle to permit the escape of germs and gases from the interior of the eggs, subjecting them to the action of a gaseous antiseptic to kill the germs emerging from the eggs and by entering the pores of the latter to prevent decomposition, removing the gaseous antiseptic from the receptacle and creating another vacuum therein, closing the pores of the eggs with soluble glass without affecting the vacuum formed by the removal of the gaseous antiseptic, removing the eggs from the receptacle and permitting them to dry in the open air, and finally applying to them a moisture-proof surface coating of shellac and alcohol, substantially as described.

3. The herein-described process for preserving eggs consisting in placing the eggs in an air-tight receptacle, creating a vacuum in the receptacle to permit the escape of germs and gases from the interior of the eggs, subjecting them to the action of a gaseous antiseptic to kill the germs emerging from the eggs and by entering the pores of the latter to prevent decomposition, removing the gaseous antiseptic from the receptacle and creating another vacuum therein, closing the pores of the eggs with a soluble sealing material without affecting the vacuum formed by the removal of the gaseous antiseptic, removing the eggs from the receptacle and permitting them to dry in the open air, and finally applying a moisture-proof surface coating, substantially as described.

In testimony that I claim the foregoing as my own I have hereto affixed my signature in the presence of two witnesses.

JAMES WILLIAM GREEN.

Witnesses:
GEO. A. BRODIE,
R. M. KAMINSKY.